May 10, 1927.
R. G. URCH
1,627,940
UNIVERSAL JOINT
Filed Nov. 3, 1926
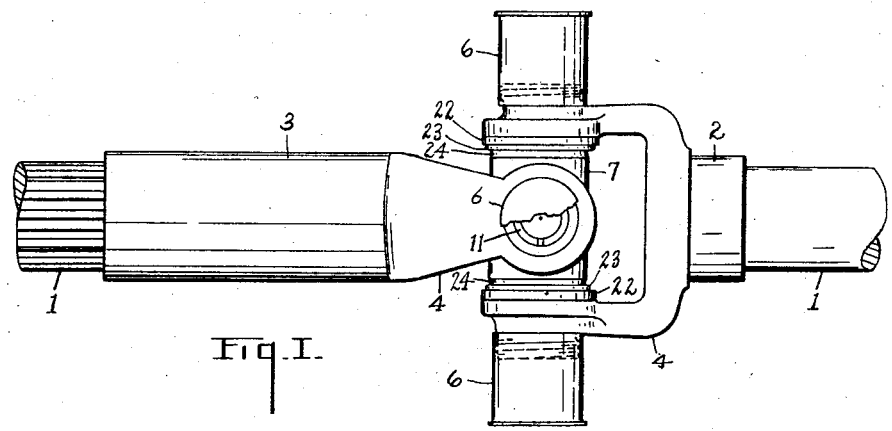
Fig. I.
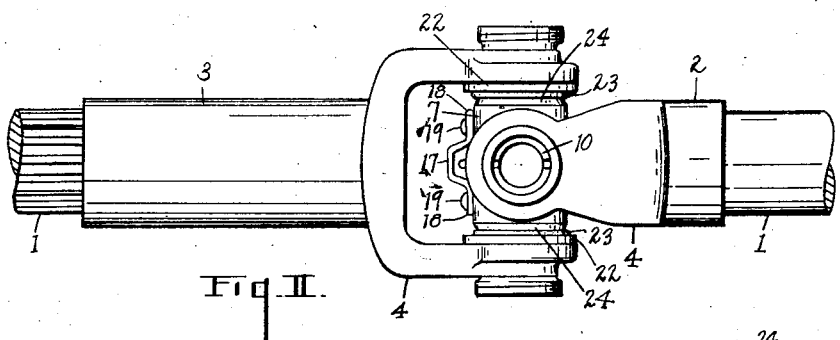
Fig. II.
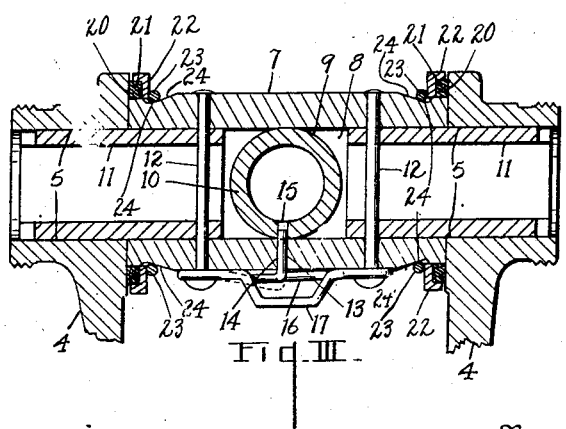
Fig. III.
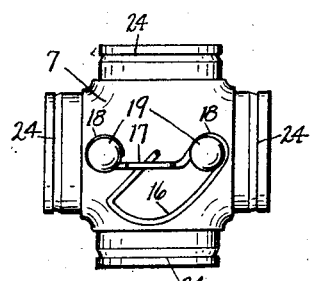
Fig. IV.
Inventor
Raymond G. Urch
By Chappell Earl
Attorneys Patented May 10, 1927.

1,627,940

UNITED STATES PATENT OFFICE.

RAYMOND G. URCH, OF ALLEGAN, MICHIGAN.

UNIVERSAL JOINT.

Application filed November 3, 1926. Serial No. 145,969.

This invention relates to improvements in universal joints.

The main objects are to provide a universal joint of the journal pin type which may be readily assembled or disassembled as occasion may require, and one which is economical to manufacture and strong and durable.

Further objects, relating to details of construction and operation, will appear from the detailed description to follow.

I accomplish the objects of the invention by the devices and means described in the following specification. The invention is defined and pointed out in the claims.

A structure which is a preferred embodiment of my invention is illustrated in the accompanying drawing, forming a part of this application, in which:

Fig. 1 is a side view of my improved universal joint, a portion of one of the bearing caps being broken away, the shafts being shown in sections.

Fig. 2 is a view of the structure given a quarter turn from the position shown in Fig. 1, with the bearing caps removed.

Fig. 3 is a detail longitudinal section showing structural details of the coupling member of the joint.

Fig. 4 is a side view of the center block of the coupling member.

In the drawing similar numerals of reference refer to similar parts throughout the views.

Referring to the drawing, 1, 1 represent the shafts to be coupled. The shaft members 2 and 3 are provided with forks 4 terminating in bearings 5. These bearings are threaded to receive the caps 6 which constitute grease cups. The coupling comprises a cruciform center block 7 having transverse intersecting bores 8 and 9, the bores being of the same diameter. A through journal pin 10 is arranged in the bore 9 to project at the ends of the center block, providing journals for one of the shaft members. The short journal members or pins 11 are arranged in the other bore at the sides of the through pin 10, as shown in Fig. 3. The pins 11 are retained by the locking pins 12 which are preferably riveted as shown in the drawing. The pin 10 is retained by the spring retaining pin 13 which is arranged through a hole 14 in the side of the center block to engage a registering hole 15 in the pin 10. This pin 14 is carried by spring arm 16 having a yoke-like body portion 17 with coils 18 therein engaged by the heads 19 of the locking pins 12 so that these locking pins serve the double function of locking the journals 11 and securing the spring retaining pin.

The yoke-shaped body 17 serves as a guard for the pin 13, it being disposed across the arm thereof so that the same is not distorted by careless workmen when removing or inserting the journal pin 10. This provides an effective and simple means for retaining the parts in assembled relation, and permits the use of jounals of the same diameter, and the assembling and disassembling of the mounting for a motor vehicle or for purposes of renewal parts.

The shaft members are provided with annular bearing seats 20 surrounding the arms of the center block and with which the gaskets 21 coact. These gaskets are supported by the followers 22 which are preferably of angle cross section, as illustrated. The followers are retained by means of springs 23 engaging the beveled shoulders 24 on the arms of the center block. The resilience of the rings coacting with the inclined or beveled surfaces of the shoulders causes the rings to urge the followers toward the gasket faces.

This provides a simple and effective means for supporting the gaskets and permits renewal or replacement thereof as occasion may require.

Having thus described my invention what I claim as new and desire to secure by Letters Patent is:

1. In a universal joint, the combination of a pair of forked shaft members provided with bearings at their ends, a coupling member comprising a center block having intersecting bores of the same diameter, a through journal pin disposed in one of the said bores of said center block, a pair of journal pins disposed in the other bore of said center block at the sides of the said through journal pin, locking pins arranged through said center block to engage said pair of journal pins, and a spring retaining pin disposed through the side of the center block to engage said through journal pin, said spring retaining pin being formed of wire and having a yoke-shaped body portion terminating in coils engaged with said locking pins and constituting a guard, said spring pin being carried by an integral arm extending from one of said coils and disposed under said guard.

2. In a universal joint, the combination of a pair of forked shaft members provided with bearings at their ends, a coupling member comprising a center block having intersecting bores of the same diameter, a through journal pin disposed in one of the said bores of said center block, a pair of journal pins disposed in the other bore of said center block at the sides of the said through journal pin, locking pins arranged through said center block to engage said pair of journal pins, and a spring retaining pin disposed through the side of the center block to engage said through journal pin, said spring retaining pin being formed of wire and having a body portion engaged with said locking pins.

3. In a universal joint, the combination with a pair of forked shaft members having bearings at their ends, of a coupling member comprising a cruciform center block having transversely disposed bores therein, journals arranged in said bores to project from said block to coact with said shaft member bearings, said shaft member bearings being provided with annular packing seats surrounding the arms of the said center block, said center block arms having outwardly beveled annular surfaces adjacent their ends, gaskets arranged on said arms of said center block to coact with said gasket seats of said shaft members, and split resilient rings engaging said beveled surfaces for supporting said gaskets.

4. In a universal joint, the combination with a pair of forked shaft members having bearings in their ends, of a coupling member comprising a cruciform center block having projecting journals coacting with said shaft member bearings, said shaft member bearings being provided with inwardly facing annular packing seats surrounding the arms of the said center block, said arms having outwardly beveled annular surfaces adjacent their ends, gaskets arranged on said arms of said center block to coact with said gasket seats of said shaft members, annular followers for said gaskets, and split resilient rings engaging said beveled surfaces for supporting said gasket followers.

5. In a universal joint, the combination with a pair of forked shaft members having bearings in their ends, of a coupling member comprising a cruciform center block having projecting journals coacting with said shaft member bearings, said shaft member bearings being provided with inwardly facing annular packing seats surrounding the arms of the said center block, said arms having outwardly beveled annular surfaces adjacent their ends, gaskets arranged on said arms of said center block to coact with said gasket seats of said shaft members, and split resilient rings engaging said beveled surfaces for supporting said gaskets.

In witness whereof I have hereunto set my hand and seal.

RAYMOND G. URCH. [L. S.]